United States Patent [19]
Arey et al.

[11] Patent Number: 5,637,838
[45] Date of Patent: Jun. 10, 1997

[54] APPARATUS FOR MEASURING, WEIGHING AND COUNTING FISH

[76] Inventors: Clyde D. Arey; Rodney D. Arey, both of 1220 St. Matthews Church Rd., Salisbury, N.C. 28146; William B. Tannehill, 563 Oak Brook Dr., Martinez, Ga. 30907

[21] Appl. No.: 285,186

[22] Filed: Aug. 3, 1994

[51] Int. Cl.$^6$ .......................... G01G 19/56; G01G 19/00; G01B 1/00
[52] U.S. Cl. .......................... 177/148; 177/238; 177/245; 177/4; 33/484; 33/485; 33/767; 33/511
[58] Field of Search .................................... 177/126, 127, 177/148, 149, 238, 245, 2, 3, 4; 33/511, 767, 484, 485

[56] References Cited

U.S. PATENT DOCUMENTS

| | | | |
|---|---|---|---|
| 1,045,425 | 11/1912 | Millward | 177/245 |
| 1,474,804 | 11/1923 | Tyrrell | 33/511 |
| 2,204,353 | 6/1940 | Fulton | 33/767 |
| 2,603,474 | 7/1952 | Mandolf et al. | 177/148 |
| 2,702,402 | 2/1955 | Haas | 33/484 |
| 2,745,447 | 5/1956 | Studley, Jr. | 33/485 |
| 2,750,184 | 6/1956 | Warndahl | 177/126 |
| 3,259,988 | 7/1966 | Lunn | 33/511 |
| 5,031,710 | 7/1991 | Parker et al. | 177/148 X |
| 5,097,617 | 3/1992 | Craven | 33/511 X |
| 5,148,607 | 9/1992 | Lasiter | 33/485 X |
| 5,339,539 | 8/1994 | O'Keefe | 33/511 |
| 5,526,575 | 6/1996 | Hoover et al. | 33/485 |

*Primary Examiner*—Michael L. Gellner
*Assistant Examiner*—Randy W. Gibson

[57] ABSTRACT

An apparatus for measuring, weighing and counting fish comprising a main body portion having long parallel side edges and short parallel upper and lower edges in a rectangular configuration, the main body portion having a front face and a back face and a slot for the receipt of a slidable member therein, the main body portion also having a recess centrally formed in the upper face thereof in a generally inverted V-shaped configuration with a ledge, the apex of the V being adapted to receive the head of a fish to be measured; a generally rectangular slide member positionable within the slot of the main body portion, the slide member being in a generally L-shaped configuration with a long portion slidably positioned within the slot of the main body portion and with a short portion at right angles with respect thereto adjacent the lower edge of the main body portion adapted to receive the tail of the fish to be measured, the slide member having indicia as to a fish length formed adjacent to the front face thereof, the indicia formed in a linear array and with notches formed in the side edges of the slide member; and adjustable coupling members formed adjacent to the lower edge of the main body portion at a side thereof, the coupling members including a hinge member and, on one side thereof, a projection extending through an adjacent wall of the main body portion into a preselected notch in the slide member to lock the slide member with respect to the main body portion, the adjustable members including a spring and recesses to urge the projection into a preselected side notch.

4 Claims, 4 Drawing Sheets

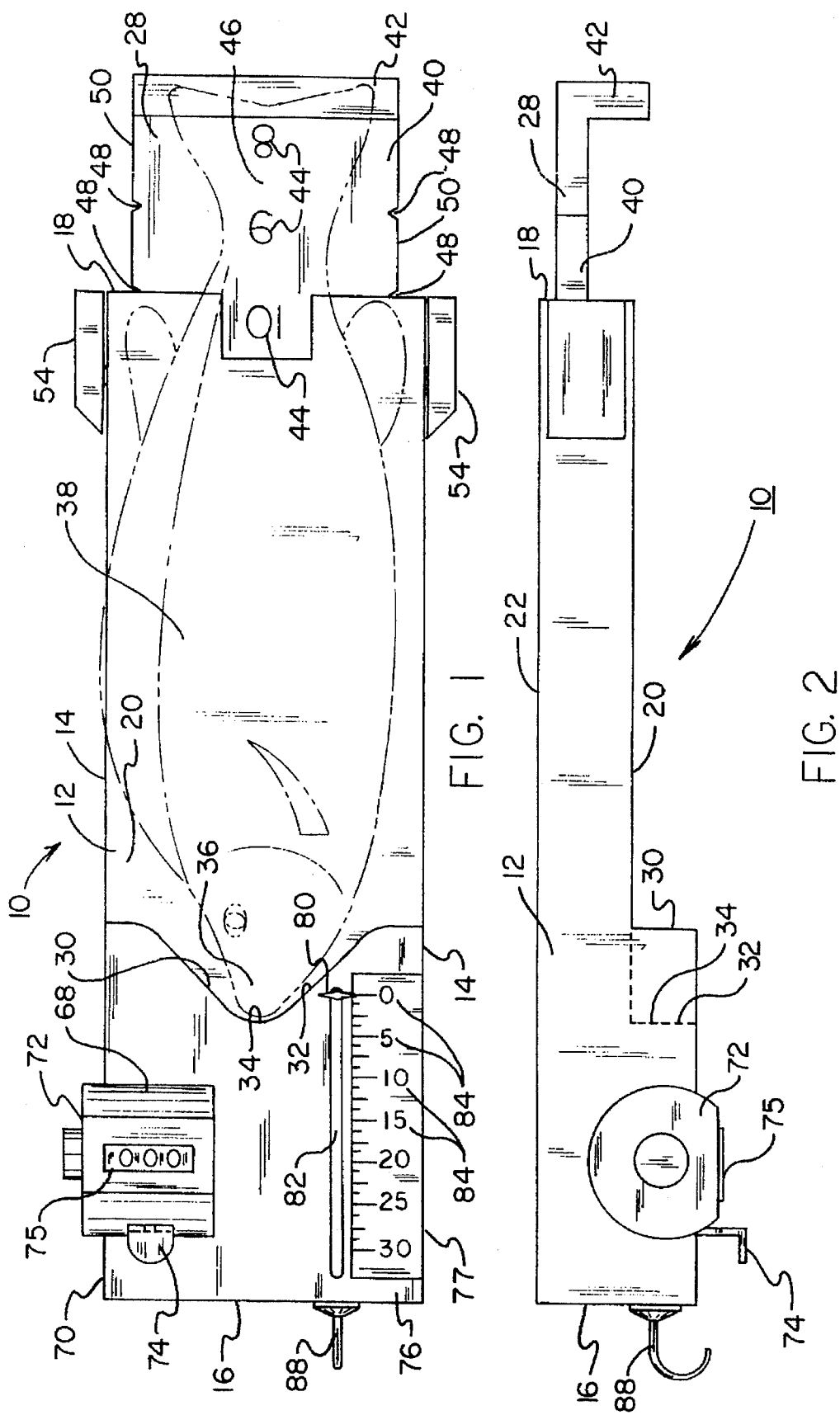

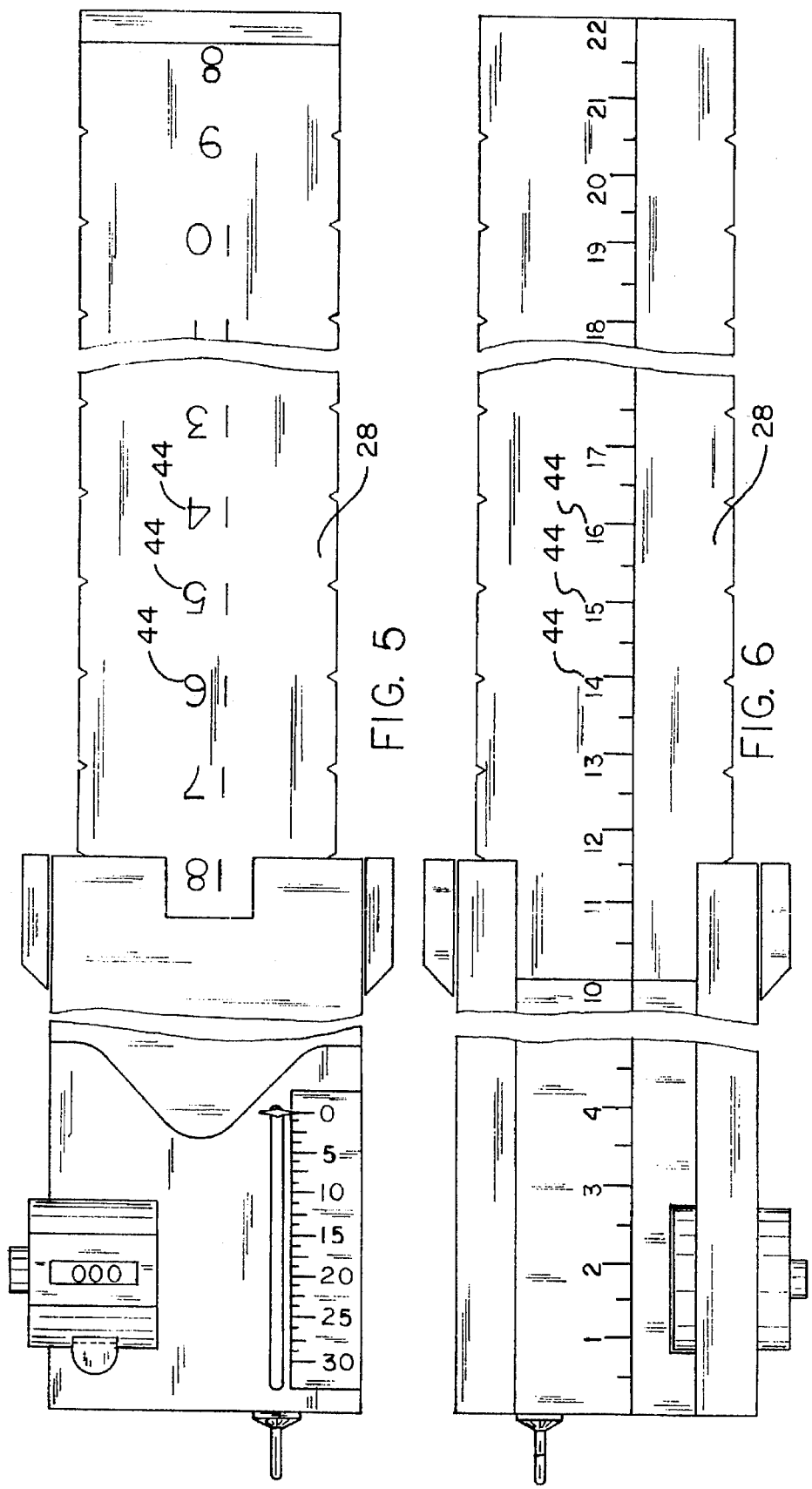

APPARATUS FOR MEASURING, WEIGHING AND COUNTING FISH

BACKGROUND OF THE INVENTION

1. Field of the Invention

The present invention relates to an apparatus for measuring, weighing and counting fish and more particularly pertains to assisting fishermen in the measuring and/or weighing and/or counting of caught fish through a unitary device.

2. Description of the Prior Art

The use of devices to measure and/or to weigh and/or to count fish of a wide variety of designs and configurations is known in the prior art. More specifically, fishing aids heretofore devised and utilized for the purpose of measuring fish and/or weighing fish and/or counting fish by various methods and/or apparatuses are known in the art and are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,643,267 to Southern a fish weight and length comparison apparatus.

U.S. Pat. No. 4,721,174 to Letzo discloses a fish weight scale.

U.S. Pat. No. Des. 310,046 to Matcham discloses a fish container.

U.S. Pat. No. 5,097,617 to Craven discloses an apparatus for measuring fish.

U.S. Pat. No. Des. 335,635 to Robbins discloses a fish weighing scale.

In this respect, the apparatus for measuring, weighing and counting fish according to the present invention substantially departs from the conventional concepts and designs of the prior art, and in so doing provides an apparatus primarily developed for the purpose of assisting fishermen in the measuring and/or weighing and/or counting of caught fish through a unitary device.

Therefore, it can be appreciated that there exists a continuing need for a new and improved apparatus for measuring, weighing and counting fish which can be used to assist fishermen in the measuring and/or weighing and/or counting of caught fish through a unitary device. In this regard, the present invention substantially fulfills this need.

SUMMARY OF THE INVENTION

In view of the foregoing disadvantages inherent in the known types of fishing aids of a wide variety of designs and configurations now present in the prior art, the present invention provides an improved apparatus for measuring, weighing and counting fish. As such, the general purpose of the present invention, which will be described subsequently in greater detail, is to provide a new and improved apparatus for measuring, weighing and counting fish apparatus and method which has all the advantages of the prior art and none of the disadvantages.

To attain this, the present invention essentially comprises a new and improved apparatus for measuring, weighing and counting fish comprising, in combination, a main body portion having long parallel side edges and short parallel upper and lower edges in a rectangular configuration, the main body portion having a front face and a back face and a slot for the receipt of a slidable member therein, the main body portion also having a recess centrally formed in the upper face thereof in a generally inverted V-shaped configuration with a ledge, the apex of the V being adapted to receive the head of a fish to be measured; a generally rectangular slide member positionable within the slot of the main body portion, the slide member being in a generally L-shaped configuration with a long portion slidably positioned within the slot of the main body portion and with a short portion at right angles with respect thereto adjacent the lower edge of the main body portion adapted to receive the tail of the fish to be measured, the slide member having indicia as to a fish length formed adjacent to the front face thereof, the indicia formed in a linear array and with notches formed in the side edges of the slide member; adjustable coupling members formed adjacent to the lower edge of the main body portion at a side thereof, the coupling members including a hinge member and, on one side thereof, a projection extending through an adjacent wall of the main body portion into a preselected notch in the slide member to lock the slide member with respect to the main body portion, the adjustable members including a spring and recesses to urge the projection into a preselected side notch; a generally cylindrical opening formed into a first upper edge of the main body portion with a removable counter with a button removably positioned within the opening. A readout indicates the times the button is depressed to count the fish; a scale formed in a second upper edge end of the main body portion with a coil spring and a pointer positioned through the elongated slot with laterally offset indicia representative of weight of a fish; and a hook at the upper edge of the main body portion adapted to receive and support a fish and to move the pointer downwardly in response to the weight of the fish and the depression of the spring and pointer in response thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus for measuring, weighing and counting fish which has all the advantages of the prior art devices to measure and/or to weigh and/or to count fish, the device as being of a wide variety of designs and configurations and none of the disadvantages.

It is another object of the present invention to provide a new and improved apparatus for measuring, weighing and counting fish which may be easily and efficiently manufactured and marketed.

It is a further object of the present invention to provide a new and improved apparatus for measuring, weighing and counting fish which is of a durable and reliable construction.

An even further object of the present invention is to provide a new and improved apparatus for measuring, weighing and counting fish which is susceptible of a low cost of manufacture with regard to both materials and labor, and which accordingly is then susceptible of low prices of sale to the consuming public, thereby making such devices to measure and/or to weigh and/or to count fish economically available to the buying public.

Still yet another object of the present invention is to provide a new and improved apparatus for measuring, weighing and counting fish which provides in the apparatuses and methods of the prior art some of the advantages thereof, while simultaneously overcoming some of the disadvantages normally associated therewith.

Still another object of the present invention is to assist fishermen in the measuring and/or weighing and/or counting of caught fish through a unitary device.

Lastly, it is an object of the present invention to provide a new and improved apparatus for measuring, weighing and counting fish comprising a main body portion having long parallel side edges and short parallel upper and lower edges in a rectangular configuration, the main body portion having a front face and a back face and a slot for the receipt of a slidable member therein, the main body portion also having a recess centrally formed in the upper face thereof in a generally inverted V-shaped configuration with a ledge, the apex of the V being adapted to receive the head of a fish to be measured; a generally rectangular slide member positionable within the slot of the main body portion, the slide member being in a generally L-shaped configuration with a long portion slidably positioned within the slot of the main body portion and with a short portion at right angles with respect thereto adjacent the lower edge of the main body portion adapted to receive the tail of the fish to be measured, the slide member having indicia as to a fish length formed adjacent to the front face thereof, the indicia formed in a linear array and with notches formed in the side edges of the slide member; and adjustable coupling members formed adjacent to the lower edge of the main body portion at a side thereof, the coupling members including a hinge member and, on one side thereof, a projection extending through an adjacent wall of the main body portion into a preselected notch in the slide member to lock the slide member with respect to the main body portion, the adjustable members including a spring and recesses to urge the projection into a preselected side notch.

Furthermore, the slide is a relatively stiff, relatively unbending, flat body which is approximately the same length as the main body and which rests loosely within; the slide member is held in place within the main body only by the projections of the coupling members and does not have any mechanical self return mechanism (such as the spring found in a standard tape measure).

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the preferred embodiment of the new and improved apparatus for measuring, weighing, and counting fish constructed in accordance with the principles of the present invention.

FIG. 2 is a side elevational view of the device shown in FIG. 1.

FIG. 5 is a top plan view of the device shown in FIG. 1 but with the fish removed.

FIG. 6 is a rear plan view of the device as shown in FIGS. 1 and 5.

The same reference numeral refers to the same part throughout the various figures.

DESCRIPTION OF THE PREFERRED EMBODIMENT

Figure 3:
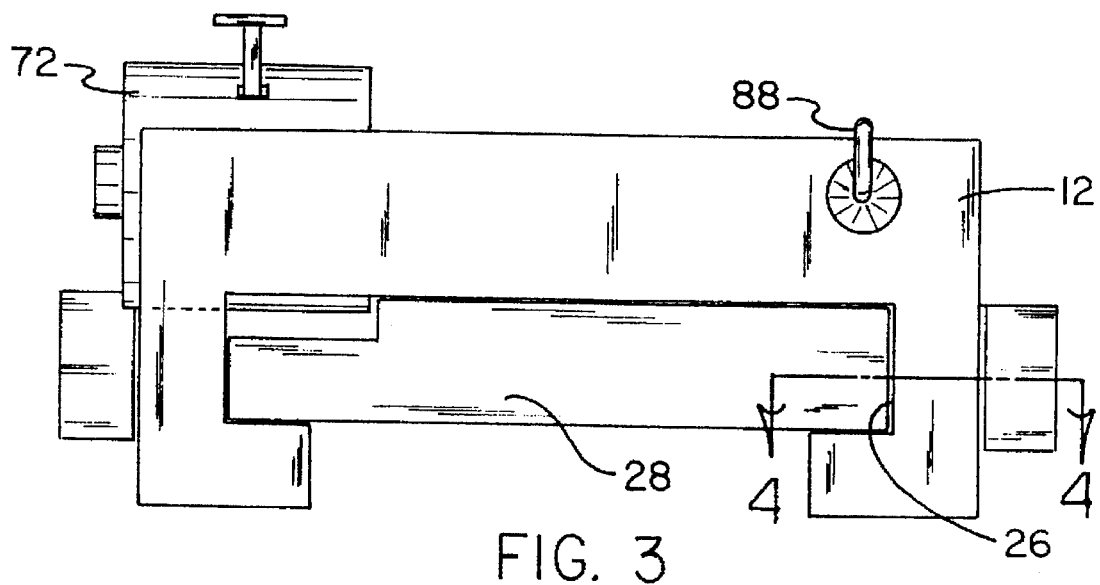
FIG. 3 is an end elevational view of the device shown in FIGS. 1 and 2.
Figure 4:
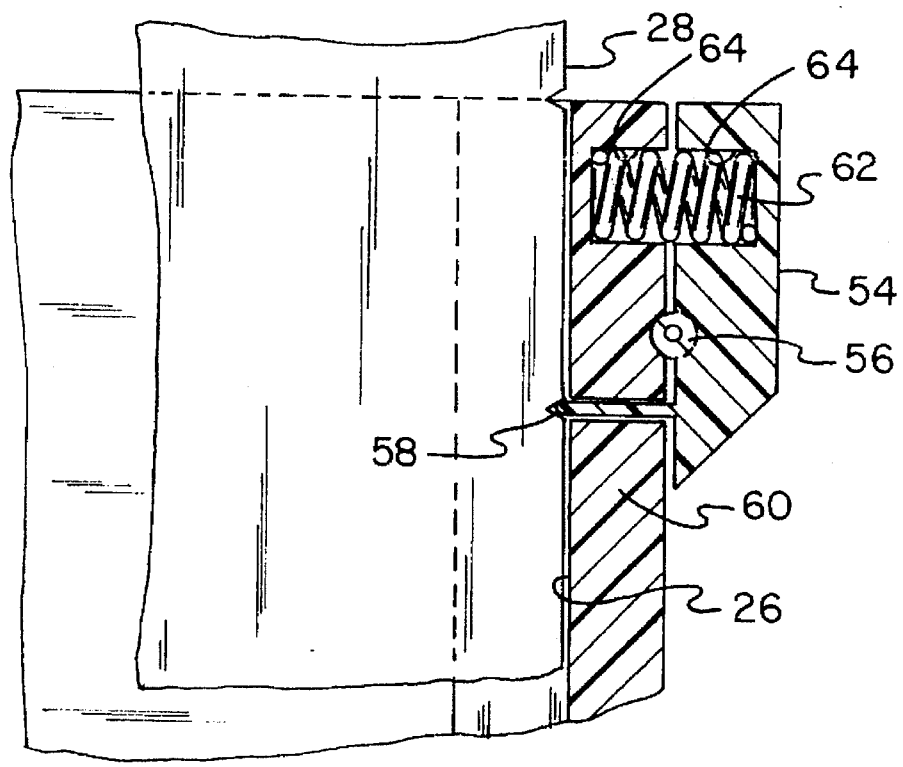
FIG. 4 is a cross-sectional view taken along line 4—4 of FIG. 3.
Figure 7:
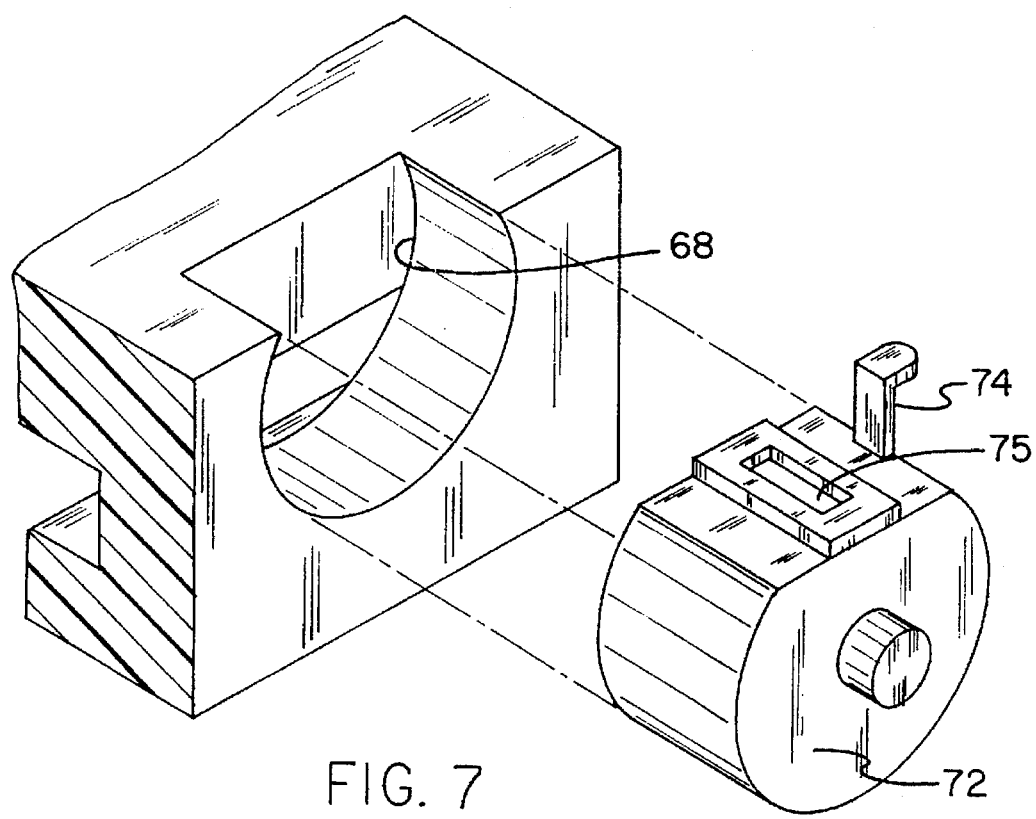
FIG. 7 is an exploded perspective illustration of the counter illustrated in FIGS. 1, 2, 3, 5 and 6.
Figure 8:
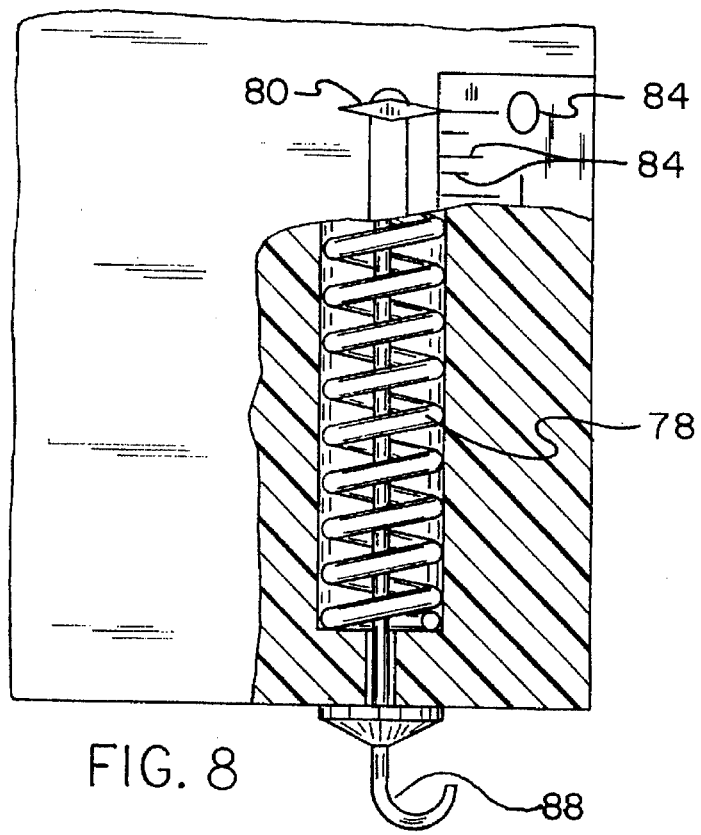
FIG. 8 is a front elevational view of the scale shown in FIGS. 1 and 5 but with parts removed to show certain internal constructions thereof.

With reference now to the drawings, and in particular to FIG. 1 thereof, a new and improved apparatus for measuring, weighing and counting fish embodying the principles and concepts of the present invention and generally designated by the reference numeral 10 will be described.

The present invention, the new and improved apparatus for measuring, weighing and counting fish is a system comprised of a plurality of components. The components in their broadest context include a main body portion, a slide member, adjustable coupling members, a cylindrical opening and counter, and a scale. Each of the individual components is specifically configured and correlated one with respect to the other to attain the desired objectives.

More specifically, the central component of the system 10 of the present invention is a main body portion 12. Such main body portion has long parallel side edges 14 and short parallel upper and lower edges 16 and 18 coupled together in a rectangular configuration. The main body portion has a front face 20 and a back face 22.

A slot 26 is formed into the lower edge. Such slot is for the receipt of a slidable member 28 therein. This will be described in greater detail hereinafter. The main body portion also has a recess 30. Such recess is centrally formed in the upper face of the main body portion. It is in a generally inverted, V-shaped configuration. It forms a ledge 32. The apex 34 of the V is adapted to receive the head 36 of a fish 38 which is to be measured in association with the main body portion and slidable member.

Next provided is the generally rectangular slide member 28. Such slide member is positionable within the slot 26 of the main body portion 12. The slide member 28 is a generally flat member but with an upturned end to define a generally L-shaped configuration. It has a long portion 40 slidably positioned within the slot 26 of the main body portion. It also has a short portion 42 at right angles with respect thereto. This is adjacent the lower edge 18 of the main body portion. Such short portion 42 is adapted to receive the tail of the fish to be measured.

The slide member has thereon indicia 44 in the form of numbers indicating a number of inches of the fish length to be measured. Such indicia 44 is formed adjacent to and on the front face 46 of the slide member 28. The indicia is formed in a linear array. At locations corresponding to the inches, notches 48 are formed in the side edges 50 of the slide member. The purposes of the notches will be described hereinafter.

Adapted to function in association with the notches 48 are adjustable coupling members 54. Such coupling members 54 are secured to the side edges of the main body portion adjacent to the lower edge 18 of the main body portion. These are formed on at least one side but preferably both sides of the main body portion. The coupling members include a hinge member 56. Further, a projection 58 extends through each adjacent wall 60 of the main body portion. The projection extends into a preselected notch in the slide member. This is to lock the slide member with respect to the main body portion in an orientation to indicate the length of the fish. The adjustable members also include a spring 62 and recesses 64. The spring functions to urge the projection into locking engagement with the preselected notch in the slide member.

The next function of the system 10 is effected for counting the fish caught. To this end, a generally cylindrical opening 68 is formed into a first upper edge 70 of the main body portion. A generally conventional counter 72 is removably positioned within the opening. The counter has a button 74. A readout 75 indicates the times the button is depressed. The button is depressed for each fish caught. Consequently, the readout 75 indicates the number of fish caught with the button 74 being depressed for each such fish caught.

The final function of the system 10 is provided for weighing the fish being caught. To this end a scale 77 is formed in the second upper edge 76 of the main body portion. The central component of the scale is a coil spring 78. Coupled to the coil spring is a pointer 80. The pointer is positioned through an elongated slot 82 formed within the main body portion. Laterally offset indicia 84 positioned adjacent to the pointer functions as a representative reading of the weight of a fish caught and weighed on the scale.

In order for the scale to properly function, a hook 88 is provided at the upper edge of the main body portion. Such hook is adapted to be positioned on a fixed member whereby the main body portion may receive and support a fish. In such orientation, the weight of the fish will move the pointer downwardly in response to the weight of the fish and the depression of the spring and pointer. In this manner, the system 10 of the present invention can weigh a fish on the scale 77, count the fish with the counter 72 and measure the length of the fish through the indicia 44 on the slide member 38 reciprocable within the main body portion 12.

The present invention is a single device which is used to measure the length of the fish which has been caught, weigh it, and add it to the count for the day, if it is not returned to the water.

This unit is made of plastic, and functions like a caliper, with a body and a member that slides smoothly in it, with a fixed jaw, or stop at the end. The end of the fish is placed against a measuring notch in the caliper body, and the slide is extended until it reaches the tail. Graduations show the length in inches on one side, and in metric units on the other. Spring loaded detents engage teeth on both edges of the slide at one inch increments so the tool can be set at the minimum length for the type of fish which are being caught.

A mechanical counter is also incorporated into the body, as well as a scale for weighing the fish. The three functions are combined in the present invention in such a manner that will make it very inexpensive to produce, and compact enough to fit in a tackle box, with provisions for readily securing it to a bucket or ice chest.

In addition to its convenience from an informational and statistical standpoint, it is a necessity, if the fishing rules and laws are to be obeyed. Every state has regulations that relate to the size, age, and weight of the fish that are found in their waters, so all anglers should have equipment of the type that is provided by this invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus for measuring, weighing and counting fish comprising, in combination:

a main body portion having long parallel side edges and short parallel upper and lower edges in a rectangular configuration, the main body portion having a front face and a back face and a slot for the receipt of a slidable member therein, the main body portion also having a recess centrally formed in the upper face thereof in a generally inverted V-shaped configuration with a ledge, the apex of the V being adapted to receive the head of a fish to be measured;

a generally rectangular slide member positionable within the slot of the main body portion, the slide member being in a generally L-shaped configuration with a long portion slidably positioned within the slot of the main body portion and with a short portion at right angles with respect thereto adjacent the lower edge of the main body portion adapted to receive the tail of the fish to be measured, the slide member having indicia as to a fish length formed adjacent to the front face thereof, the indicia formed in a linear array and with notches formed in the side edges of the slide member;

adjustable coupling members connected by a hinge member adjacent to the lower edge of the main body portion at a side thereof, the coupling members including, on one side thereof, a projection extending through an adjacent wall of the main body portion into a preselected notch in the slide member to lock the slide member with respect to the main body portion, the adjustable members including a spring and recesses to urge the projection into a preselected side notch;

a generally cylindrical opening formed into a first upper edge of the main body portion with a removable counter with a button removably positioned within the opening;

a scale formed in a second upper edge end of the main body portion with a coil spring and a pointer positioned through the elongated slot with laterally offset indicia representative of weight of a fish; and a hook at the upper edge of the main body portion adapted to receive and support a fish and to move the pointer downwardly in response to the weight of the fish and the depression of the spring and pointer in response thereto wherein the hook is situated on a upper edge of the main body portion.

2. An apparatus for measuring, weighing and counting fish comprising:

a main body portion having long parallel side edges and short parallel upper and lower edges in a rectangular configuration, the main body portion having a front face and a back face and a slot for the receipt of a slidable member therein, the main body portion also having a recess centrally formed in the upper face thereof in a generally inverted V-shaped configuration with a ledge, the apex of the V being adapted to receive the head of a fish to be measured;

a generally rectangular slide member positionable within the slot of the main body portion, the slide member being in a generally L-shaped configuration with a long portion slidably positioned within the slot of the main body portion and with a short portion at right angles with respect thereto adjacent the lower edge of the main body portion adapted to receive the tail of the fish to be measured, the slide member having indicia as to a fish length formed adjacent to the front face thereof, the indicia formed in a linear array and with notches formed in the side edges of the slide member; and adjustable coupling members connected by a hinge member adjacent to the lower edge of the main body portion at a side thereof, the coupling members including, on one side thereof, a projection extending through an adjacent wall of the main body portion into a preselected notch in the slide member to lock the slide member with respect to the main body portion, the adjustable members including a spring and recesses to urge the projection into a preselected side notch.

3. The apparatus as set forth in claim 2 and further including:

a generally cylindrical opening formed into a first upper edge of the main body portion with a removable counter with a button removably positioned within the opening.

4. The apparatus as set forth in claim 2 and further including:

a scale formed in a second upper edge end of the main body portion with a coil spring and a pointer positioned through the elongated slot with laterally offset indicia representative of weight of a fish; and a hook at the upper edge of the main body portion adapted to receive and support a fish and to move the pointer downwardly in response to the weight of the fish and the depression of the spring and pointer in response thereto, wherein the hook is situated on an upper edge of the main body portion.

* * * * *